July 18, 1950     L. E. WELLS     2,516,084

STORAGE BATTERY

Filed Oct. 4, 1944

INVENTOR.
LELAND E. WELLS
BY
Kwis Hudson Boughton & Williams
ATTORNEYS

Patented July 18, 1950

2,516,084

UNITED STATES PATENT OFFICE 2,516,084

STORAGE BATTERY

Leland E. Wells, Cleveland Heights, Ohio, assignor to Willard Storage Battery Company, Cleveland, Ohio, a corporation of West Virginia Application October 4, 1944, Serial No. 557,101

6 Claims. (Cl. 136—162)

This invention relates to storage batteries and has particular reference to batteries which when in use are positioned in equipment, such as portable radios, where it is difficult to unscrew the vent plugs in order to service the battery, i. e., to supply water or electrolyte to the battery, etc., and to again screw the vent plugs in place.

More particularly the invention relates to a sealing device or closure member which may be secured in a filling well opening so as to replace the ordinary filler plug and to permit easy servicing of the battery without removal of the closure member. Further, the invention aims to provide an improved closure member which will be non-spill or leak-proof.

The invention comprises a disk of rubber or rubber-like material with a pinhole or slit extending therethrough through which the stem of the filling instrument, such as a syringe or eyedropper, can be inserted, the opening in the disk stretching by pressure from the filling instrument and closing immediately after the filling instrument is withdrawn.

The invention may be further briefly summarized as consisting in certain novel details of construction and combinations and arrangements of parts which will be described in the specification and set forth in the appended claims.

In the accompanying sheet of drawings illustrating my invention,

Figure 1:
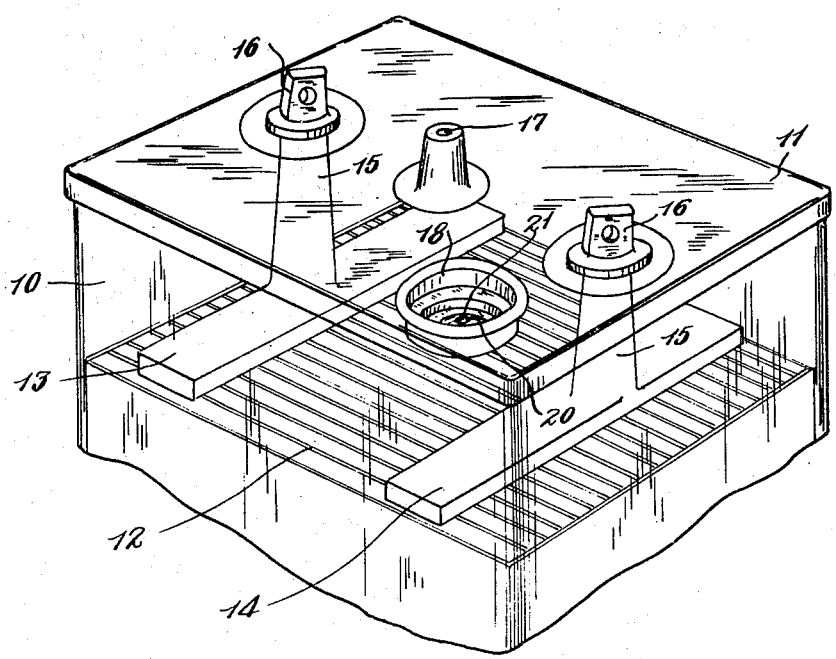
Fig. 1 is a perspective view of the upper part of a storage battery embodying my invention.

The construction of the battery with which my invention may be utilized is immaterial to the present invention, but in this instance I have shown a battery having a rigid case 10 including a cover 11 both formed from a transparent plastic, such as polystyrene. The battery is provided with positive and negative plates 12 separated by suitable insulation (not shown). A single cell battery is herein illustrated, and the positive and negative plates are connected respectively to straps 13 and 14 having upstanding posts 15 passing through the cover and forming positive and negative terminals 16 at the top of the battery. It will be understood, however, that my improved closure member may be employed in connection with each cell of a multi-cell battery.

In this instance the battery is provided with a separate vent opening 17, but in some instances this separate vent opening may be dispensed with, the battery then venting through the rubber disk which is provided in the filling well opening. At 18 I have shown a filling well in which is supported the disk involving the present invention.

Figure 2:
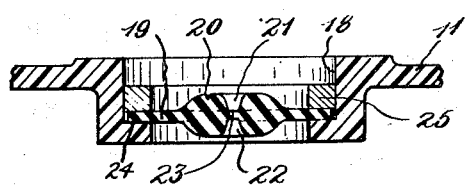
Fig. 2 is a sectional view on a slightly enlarged scale showing the preferred form of rubber disk mounted in a filling well.

The sealing device or closure member, sometimes referred to as a valve, which I prefer to employ is shown at 19 in Fig. 2. It will be noted that this closure member is in the form of a unit or separately formed disk of rubber or other suitable flexible and elastic material provided at the center with an enlargement or a thickened portion 20 extending above and below the center plane of the disk and having centrally disposed tapered depressions or recesses 21 and 22 which extend to substantially the center plane of the disk. After the disk has been formed, the thin central portion between the adjacent ends of the tapered recesses 21 and 22 is punctured as shown at 23 by the insertion of a needle or equivalent instrument of very small diameter so that normally the opening 23 will be closed. This puncture is such that the stem of a filling syringe or eyedropper may be forced through the opening formed by the puncture, the opening stretching by pressure from the filling instrument and closing immediately after the instrument is withdrawn.

The disk 19 may be cemented in place in the regular threaded filling well opening but the filling well 18 may be designed to receive this disk rather than an ordinary filler plug, in which case, as here shown, the customary threads are omitted and a shoulder 24 is provided on the interior of the well. The periphery of the disk 19 may be cemented to the interior wall of the filling well and preferably onto the shoulder 24. However, in some instances where plastic covers are employed, difficulty is encountered in cementing the disk to the plastic material. In such instances I prefer to place on top of the margin of the disk a plastic ring 25 which clamps the margin of the disk 19 between the shoulder 24 and the ring 25, the latter being cemented to the inner wall of the filling well 18 of the plastic cover 11.

Figure 4:
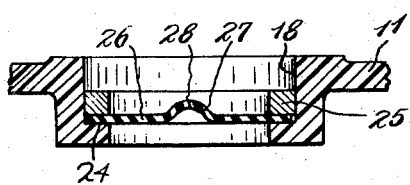
Fig. 4 is a view similar to Fig. 2 showing a modification.
Figure 5:
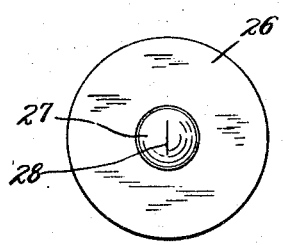
Fig. 5 is a plan view of the disk of Fig. 4 removed from the battery.
Figure 3:
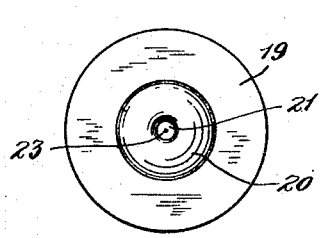
Fig. 3 is a top plan view of the disk removed from the battery.

In Figs. 4 and 5 I have shown at 26 a modified construction of the disk which is mounted in the filling well in the same manner as shown in Fig. 2. This disk 26, which is also formed of rubber or rubber-like material, has at the center an elevated or hump portion 27 of semi-spherical shape which is provided at the top with a self-closing slit 28, as best shown in Fig. 5.

It will be seen that in either case there is an extra amount of rubber around the opening 23 by reason of the enlargement or thickened portion or around the slit 28 by reason of the elevated or hump construction to insure that the opening will close after the filling instrument is withdrawn. I might say that if a simple flat sheet of rubber or rubber-like material with a pinhole or slit were employed, repeated operations of inserting the filling instrument would cause the rubber around the pinhole or slit to stretch so that the opening would no longer be self-closing. With either construction illustrated herein, the rubber disk can be used indefinitely without any danger of the opening or slit not closing after the filling instrument is withdrawn.

It will be seen therefore that a battery equipped with my improved closure member may be used in apparatus where difficulty would be encountered, in view of lack of space, in removing and restoring the usual filler plug, particularly since the opening 23 of the disk 19 or the slit 28 in the raised portion 27 of the disk 26 can be readily reached by the filling instrument, and on withdrawal of the instrument the opening or slit will immediately close so as to render the battery leakproof.

Ordinarily I prefer to employ a separate vent opening for venting the battery, but, as previously stated, the disk 19 or the disk 26 may be used with batteries not having separate vent openings, in which case the battery will be vented through the opening 23 or the slit 28.

While I have shown the preferred construction and a modification, I do not desire to be confined to the precise details shown and described but aim in my claims to cover all modifications which do not involve a departure from the spirit and the scope of the invention in its broader aspects.

Having thus described my invention, I claim:

1. A storage battery comprising a rigid battery case having a filling well and a unit disk extending across and normally closing said filling well and provided with an elastic portion having a self-closing opening through which a filling instrument may be extended, said elastic portion containing a relatively increased amount of material adjacent to said opening which tends to cause closing of said opening.

2. A storage battery having a filling well and a disk extending across and normally closing said filling well, said disk having a raised portion with a depression at the center thereof and a self-closing opening through the disk at the center of the depression.

3. A storage battery comprising a rigid battery case having a filling well and an elastic unit disk extending across and normally closing said filling well, said disk being provided with a thickened portion having a self-closing opening through which a filling instrument may be inserted.

4. A storage battery comprising a rigid battery case having a filling well and an elastic unit disk extending across and normally closing said filling well, said disk being provided at the center with a thickened portion having a centrally located self-closing opening through which a filling instrument may be inserted.

5. A storage battery having a filling well and an elastic disk extending across and normally closing said well, said disk being provided at the center thereof with a thickened portion having a depression at the center thereof and a centrally located normally closed opening through which a filling instrument may be inserted.

6. A storage battery having a filling well and a disk extending across and normally closing said well, said disk being provided at the center thereof with a thickened portion extending above and below the center plane of said disk with substantially aligned depressions in opposite sides of said thickened portion, and a centrally located normally closed opening connecting the depressions and through which a filling instrument may be inserted.

LELAND E. WELLS.

REFERENCES CITED

The following references are of record in the file of this patent:

UNITED STATES PATENTS

| Number | Name | Date |
|---|---|---|
| 996,588 | Kennedy | Jan. 27, 1911 |
| 1,366,298 | Teitelbaum | Jan. 18, 1921 |
| 1,368,817 | Marko | Feb. 15, 1921 |
| 1,732,158 | Ford | Oct. 15, 1929 |
| 1,867,249 | Clark et al. | July 12, 1932 |
| 2,094,329 | Mascuch | Sept. 28, 1939 |
| 2,190,827 | Deely | Feb. 20, 1940 |
| 2,288,889 | Costello | July 7, 1942 |
| 2,328,327 | Cobb | Aug. 31, 1943 |

FOREIGN PATENTS

| Number | Country | Date |
|---|---|---|
| 730,827 | France | May 23, 1932 |